Sept. 2, 1969 C. C. JENSEN ET AL 3,464,824
PROCESS OF PRODUCING A GRANULAR FEED
Filed Sept. 8, 1964 2 Sheets-Sheet 1

Inventors
Charles C. Jensen
Frank X. Doody
By Hibben, Noyes & Bicknell
Attorneys Sept. 2, 1969 C. C. JENSEN ET AL 3,464,824
PROCESS OF PRODUCING A GRANULAR FEED
Filed Sept. 8, 1964 2 Sheets-Sheet 2

Inventor
Charles C. Jensen
Frank X. Doody
By Hibben, Noyes & Bicknell
Attorneys

3,464,824
Patented Sept. 2, 1969

3,464,824
PROCESS OF PRODUCING A GRANULAR FEED
Charles C. Jensen, Downers Grove, and Frank X. Doody, Chicago, Ill., assignors to Darling & Company, Chicago, Ill., a corporation of Illinois
Filed Sept. 8, 1964, Ser. No. 394,828
Int. Cl. A23k 1/16
U.S. Cl. 99—2                                    4 Claims

ABSTRACT OF THE DISCLOSURE

Preparation of an animal feed in granular form by mixing a water insoluble animal feed supplement material with a water soluble material selected from the group consisting of sodium chloride and sodium phosphate and while mixing adding steam and water to moisten and agglomerate and subsequently drying said agglomerates.

---

Figure 1:
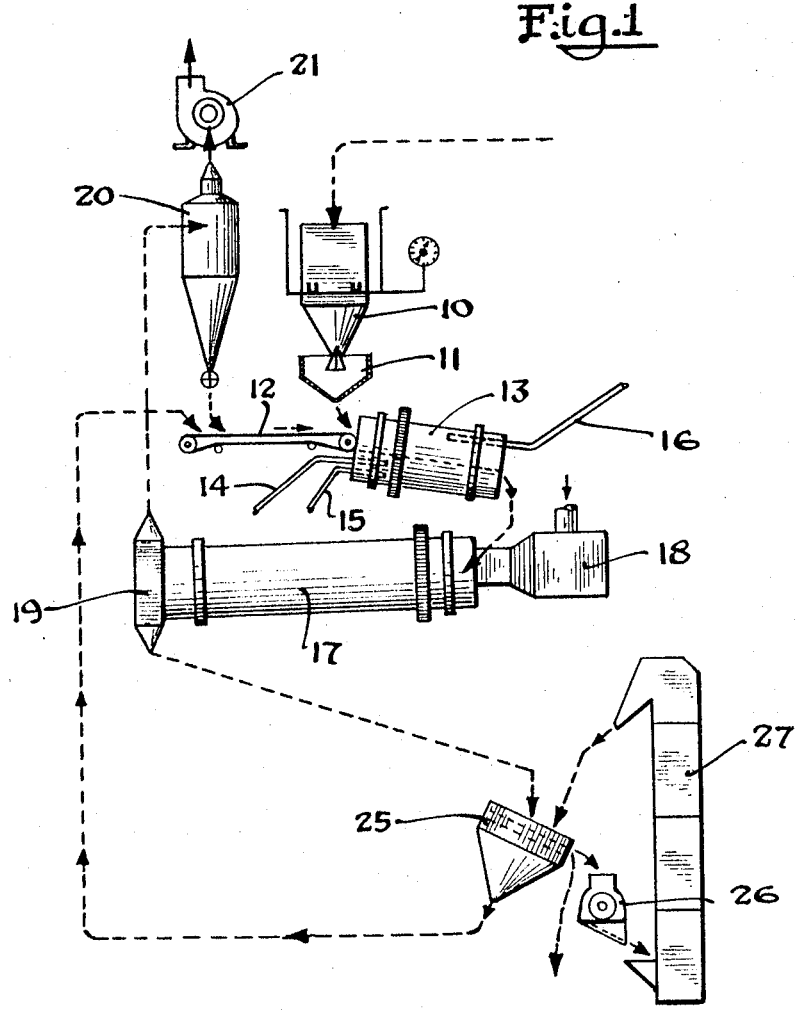

This invention relates generally to an improved feed material and more particularly to a feed material in the form of granules for animals including livestock and poultry and to a method of producing the feed granules.

In the feeding of livestock and poultry, particularly for the production of meat, it has been found that supplementing the usual feed ingredients with certain minerals or in some instances with proteins, greatly improves the efficiency of the feed so that a greater weight gain per pound of feed used is effected. While the composition of a feed supplement can be varied, certain standards have been established by recognized nutritional counsels, and a mineral feed supplement, for example, generally contain the recommended amounts of nutritionally useful sources of calcium, phosphorous, and sodium chloride, along with adequate amounts of trace minerals, including magnesium, iron, copper, cobalt, zinc, and iodine.

Feed supplements are commonly supplied in the form of a protein block or a mineral block or as a powdery mixture of finely divided or crushed ingredients to facilitate the feed supplements being mixed with the usual feed ingredients. There are, however, several serious objections to having a feed supplement in the form of a block or as a mixture of finely powdered or crushed ingredients. For example, blocks of feed supplements are subjected to weathering when left outdoors and with a powdery mixture there is a substantial loss of the feed supplement during the mixing thereof with the usual feed ingredients in the feed mill and when fed to the animals due to air currents carrying away the fine particles. The fine particles also tend to settle out of the feed mixture during handling and storage. Furthermore, many animals dislike having fine particles contact their nose and breathing passages and therefore often reject a feed containing a powdered feed supplement.

Various attempts have been made to overcome the disadvantages associated with a finely powdered feed supplement without, however, providing a completely satisfactory feed product. For example, fats and oils have been mixed with powdered or other finely divided feed supplement ingredients and the resultant plastic mass extruded to form pellets. Still others have mixed powdered mineral feed supplement with calcium sulphate and water to form a frangible product which can be broken up to form fragments having the mineral feed supplement held together by the water insoluble hydrated calcium sulphate. The sharp fragments formed and the decreased rate of solubility do not provide a satisfactory mineral feed supplement or a practical method of producing a granular mineral feed supplement. Thus, the previous attempts to form uniform granules of a feed supplement have failed to provide a satisfactory, stable granular feed product which has sufficient strength to resist crushing or dusting during packing, shipping, and mixing with the usual feed materials and which is also readily softened and spontaneously disintegrates for improved assimilation on contacting with an aqueous liquid, as when the feed supplement is ingested by livestock or poultry.

It is therefore an object of the present invention to provide an improved feed material in granular form.

It is a further object of the present invention to provide an improved granular feed material which resists being crushed during normal shipping and handling thereof.

Another object of the invention is to provide uniform granules of a feed material having a binding agent which is an essential nutritional feed ingredient.

A further object of the present invention is to provide a feed material in granular form which readily softens or disintegrates into its small constituent particles for improved assimilation on contact with an aqueous fluid, as when ingested by an animal.

Still another object of the present invention is to provide an improved mineral feed supplement material in granular form.

It is still another object of the present invention to provide a complete mineral feed supplement in the form of discrete granules comprised of fine particles held together by a binding agent which is primarily a nutritional mineral feed ingredient.

It is also an object of the present invention to provide a mineral feed supplement in a palatable granular form which resists being crushed during handling and shipping and which is readily disintegratable into fine particles for improved assimilation when the feed granules come into contact with an aqueous fluid, as when ingested by livestock and poultry.

It is a further object of the present invention to provide an improved protein feed supplement material in the form of granules.

Still another object of the present invention is to provide a more economical method of producing a granular feed material.

Figure 2:
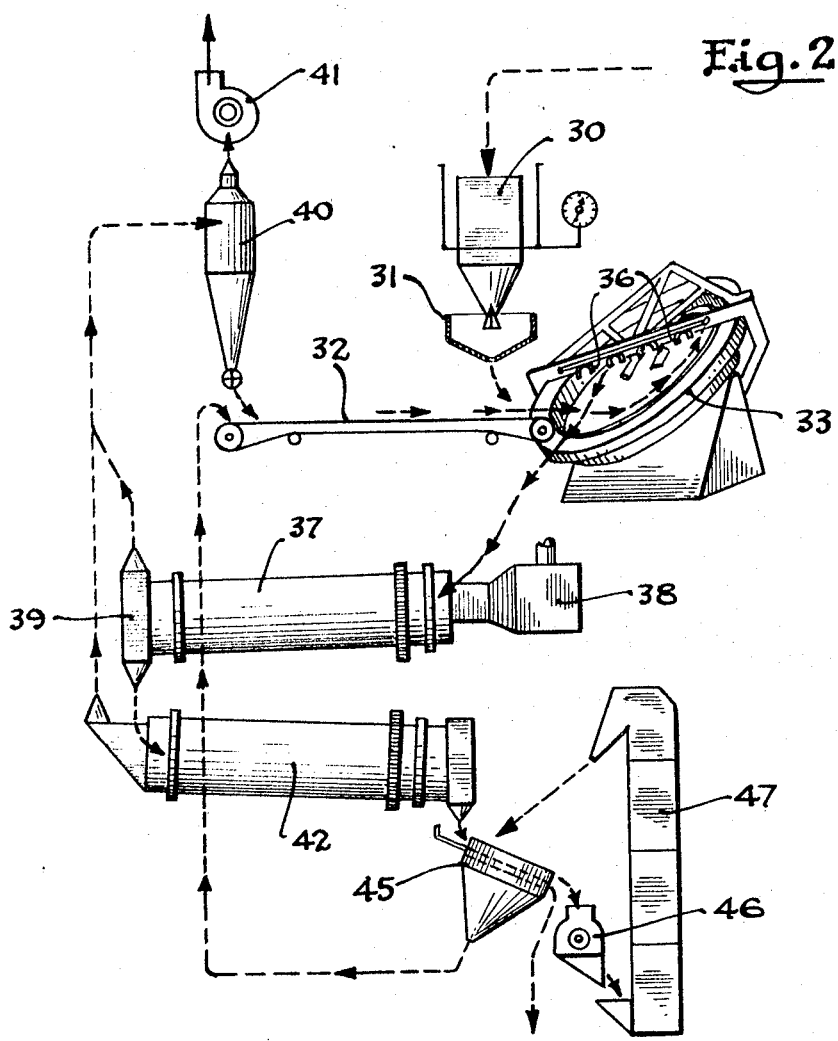

Other objects of the present invention will be apparent from the accompanying detailed description and claims to follow when read in conjunction with the attached drawing, wherein:

FIG. 1 is a schematic diagram of apparatus for carrying out the process of the present invention, and FIG. 2 is a schematic diagram of a modified form of apparatus for producing a granular feed material of the present invention.

It has been discovered that a granular feed material which has substantial resistance to crushing (i.e. is substantially non-dusting) and which is palatable and readily assimilated when ingested by an animal can be prepared from the usual nutritionally recommended feed constituents of a feed supplement material without addition of a binding agent which is not primarily a nutritional feed ingredient by subjecting finely divided nutritionally recommended feed constituents containing at least one water soluble nutritionally useful feed ingredient to an agglomerization treatment under controlled moisture and heat conditions and thereafter drying the agglomerates at a relatively low temperature to remove excess moisture and form the desired feed granules. More particularly, it has unexpectedly been found that when a mixture of substantially water insoluble particles of finely divided nutritionally useful mineral or protein feed supplement ingredients containing at least one readily water soluble nutritionally useful feed ingredient, such as sodium chloride or equivalent material in preferably nutritionally recommended amounts, is moistened with water and heated with steam while mixing in an agglomeration apparatus, such as an inclined rotating drum-type mixing cylinder or in a disc-type pelletizer, the particles of feed ingredients form agglomerates which can be dried in a drying apparatus, such as an inclined rotating cylindrical drum, by heating to a moderate temperature sufficient to effect removal of excess moisture while avoiding heat hardening the granules.

A granular mineral feed supplement, for example, made in accordance with the present invention has as the major constituents thereof a phosphate material, such as "soft phosphate," limestone, and sodium chloride, and in addition preferably contain smaller amounts of a conventional trace mineral premix, dicalcium phosphate, and bone meal. The precise quantities of the several ingredients can be varied in accordance with the requirements of the particular animals, but generally a standardized mineral feed supplement is used for several species of livestock and poultry simply by varying the amount of the feed supplement mixed with the particular feed material.

The mixture of mineral feed supplement ingredients as charged to the agglomeration apparatus has a major proportion of the particles below 20 mesh screen size and preferably having a large proportion below 60 mesh with only a minor proportion above 20 mesh screen size in order to insure that each granule will have a uniform composition. When preparing mineral feed granules which have a major proportion of the granules falling between 8 and 16 mesh screen size, for example, about 50% of the mixture is preferably below 60 mesh, about 45% is below 20 mesh and above 60 mesh, and about 5% is above 20 mesh, all on a weight basis. In preparing a mineral feed mixture having the foregoing particle size distribution for charging to an agglomeration apparatus, the mineral ingredients preferably have the following sizes: the soft phosphate has about 11% above 20 mesh, about 33% between 20 mesh and 60 mesh, and about 56% below 60 mesh; the limestone or calcium carbonate preferably has about 95–100% which passes through a No. 20 mesh screen; the salt or sodium chloride ingredient preferably has about 70% by weight thereof between about 20 and 60 mesh with the balance having a particle size less than 60 mesh; the trace mineral premix preferably has about 99% by weight thereof below 60 mesh; the dicalcium phosphate preferably has 90% by weight thereof between about 10 and 60 mesh with the balance being below 60 mesh and the bone meal preferably has 50% by weight between 20 and 60 mesh with the balance being below 60 mesh, and the iron oxide has 99% by weight below 60 mesh. While the foregoing particle size distribution of the mineral feed ingredients is not considered critical to the granulation operation, it is particularly suited for providing a granulation mineral feed supplement having a uniform composition in each granule wherein a substantial proportion of the granules have a particle size between about 8 and 16 mesh.

In the present invention, the finely divided, crushed, or powdered ingredients of the feed materials are held together in the form of granules by a readily water soluble nutritionally useful feed ingredient when agglomerating and drying in accordance with the present invention. Among the water soluble nutritionally useful feed ingredients which can be used singly or in combination in the present invention are sodium chloride, a readily water soluble phosphate compound, such as sodium phosphate, monosodium phosphate, or phosphoric acid, sugar, urea, and a water soluble protein. The necessity of adding a binder and the amount required depends on the type of feed material being granulated and the degree of strength required in the granules. When, for example, the feed material being granulated is a dried particulate protein feed material, such as meat scrap which contains a significant amount of water soluble material, a feed granule having considerable strength is formed by agglomerating and drying the feed material in accordance with the present invention without adding additional water soluble nutritionally useful material. A minimum of about 2% by weight sodium chloride is required to granulate a feed mixture where the sodium chloride is the principal water soluble material in the feed mixture being agglomerated. In the mineral feed granules, for example, sodium chloride is used in an amount comprising about 8% by weight of the dry mineral feed supplement ingredients to provide a substantially non-dusting granule having a compression strength of 0.31 lb. and where rapid and spontaneous disintegration of the granule on contact with an aqueous fluid is desired. Substantially larger amounts of water soluble binder can be used where a harder and more crush-resistant but more slowly disintegrating granule is required. Preferably between about 8% and 25% by weight sodium chloride is used to form feed supplement granules in accordance with the present invention. When the smaller amounts of sodium chloride are used in forming the mineral feed granules, it is necessary to use larger amounts of steam and water in order to form suitable feed granules. A somewhat harder feed granule can be produced by substituting for the sodium chloride a like amount of monosodium phosphate or urea or by using larger amounts of the water soluble binders. And, while the water soluble, crystallizable nutritional feed ingredient in the preferred embodiment is mixed as a finely divided solid with the other feed supplement ingredients, it is also possible to incorporate the water soluble crystallizable feed ingredient in whole or in part as a solution, as by dissolving in the water used for moistening the ingredients.

In producing a granular feed supplement in accordance with the present invention the finely divided feed constituents having the desired particle size distribution are weighed, screened, and thereafter continuously introduced into a continuously rotating shell or other mixing apparatus which is provided with water and steam outlets therein to supply the required amount of water and heat to effect agglomeration of the finely divided feed mixture. Steam and water sparger pipes are preferably disposed within the shell at the inlet end adjacent the lower surface thereof and below the normal level of its bed of the feed material so that the fine feed material ingredients are both moistened and heated as soon as charged into the rotating agglomeration shell. A fine water spray is also provided adjacent the top wall within the shell near the discharge end thereof so as to control the final moisture content and condition of the agglomerated material before the feed agglomerates are discharged from the agglomeration apparatus.

It has been found that water in an amount between about 5% and 15% by weight of solid feed constituents, preferably heated to about 120–150° F., should be added to the agglomeration shell to properly moisten a feed supplement mixture containing between about 8 to 10% by weight sodium chloride and between about 5% and 15% by weight steam should be added to properly heat the said feed mixture. The agglomerated material at the discharge end of the mixer should have a temperature between about 120° F. and 225° F. The amount of moisture and steam used will, of course, vary with the moisture content and temperature of the feed ingredients, as well as with the amount and type of water soluble material charged to the agglomerate shell. Thus, in cold weather when the ingredients are relatively cold when fed into the agglomerating shell, more steam is required to heat the material to the desired temperature. Also, the amount of water and steam must be controlled to effect the desired agglomerate or granulation size. Generally, the agglomerates being discharged from the shell into the dryer should not be over about 1 to 2 mesh and not below about 20 mesh when a final granular product having a particle size range between about 8 and 16 mesh is desired.

The cylindrical agglomeration shell is preferably about 17 ft. long and 6½ ft. in diameter, is fittted with tires and bull gears, and is mounted on trunnions for rotation by suitable drive gears at a rate of about 9 to 11 r.p.m. When larger feed granules are desired the rate of rotation of the shell should be decreased.

The agglomerated granular feed material is continuously discharged into a continuously rotating inclined cylindrical dryer or kiln which is preferably heated by a gas fired combustion chamber associated therewith at the inlet end for heating the required volume of air or other gas drawn through the dryer. The discharge end of the cylindrical dryer is provided with an outlet end stack which connects with a cyclone or other suitable dust collector and blower which draws the heated air or other gas, preferably concurrently, through the dryer and dust collector wherein the fine particles entrained in the drying gas are removed. The speed of rotation of the dryer is not critical so long as the granules are not tumbled too vigorously to effect breaking of the granules.

The volume of air drawn through the dryer is determined by standard heat transfer considerations and a cylindrical dryer having a diameter of about 7 ft. will generally have about 15,000 to 25,000 c.f.m. of hot air drawn through the dryer to effect finishing drying of the granular feed material, although the amount of drying air used depends on the rate of drying required.

If the heated air drawn through the dryer is excessively hot, the feed granules will be disintegrated or become heat hardened. Therefore, care must be taken to avoid overheating the granular feed material during drying. Accordingly, it has been found that when the exit stack temperature (which approximates very closely the granular product temperature at the discharge end of the dryer) is maintained between about 140° and 225° F., and preferably between 175° and 225° F., a granular feed product having the desired properties is produced having between about 2.5% and about 5% by weight moisture. Control of the temperature within the dryer is effected by determining the exit stack temperature and maintaining the said stack temperature between the foregoing specified temperature range.

The granular feed product which is continuously discharged from the rotating dryer can be charged directly into a rotating cylindrical cooler through which cooling air is continuously drawn to reduce the temperature of the product to approximately ambient temperature, or the granular material can be directly classified on a double deck screen or other classifying means to provide the product with a desired particle size. Granular feed products have been produced in the foregoing manner having a particle size range between 6 and 12 mesh and between 10 and 28 mesh.

The following specific examples are given in order to further illustrate the present invention but without limiting the invention to the specific proportions, ingredients, and conditions used in the illustrated examples.

Example 1

|  | Pounds |
|---|---|
| Soft phosphate | 925 |
| Limestone (calcium carbonate) | 852.5 |
| Salt (sodium chloride) | 180 |
| Trace mineral premix | 12.5 |
| Steamed bone meal | 5 |
| Dicalcium phosphate | 5 |
| Iron oxide | 20 |
|  | 2000 |

The above mineral feed ingredients are weighed and mixed in a weighing hopper 10 (see FIG. 1), screened to exclude foreign materials and held in a surge hopper 11 from which the premixed ingredients are continuously charged by means of an endless conveyor belt 12 into a continuously rotating inclined open cylindrical agglomeration shell 13. The cylindrical shell 13 is about 17 ft. long and 6½ ft. in diameter, has a smooth inner wall surface without baffles, and is rotated about its longitudinal axis at a rate of about 9 to 11 r.p.m. The rotating shell 13 is provided at its upper or charging end with a water sparger pipe 14 and a steam sparger pipe 15 disposed within the shell adjacent the lower surface thereof below the normal level of the bed of mineral feed materials. Water at a temperature of about 140° F. and steam at a temperature of about 212° F. are each introduced through the sparger pipes 14, 15 at a rate of about 100 to 200 pounds per ton of mineral feed ingredients. The water and steam dissolve the water soluble mineral feed ingredient, which in the preferred embodiment is comprised mainly of sodium chloride, and the dissolved soluble feed ingredient uniformly mixes with and moistens the finely divided particles of essentially water insoluble mineral feed ingredients. As the moistened particles are tumbled in the rotating cylindrical shell 13 the particles agglomerate and form larger particles while the mineral feed materials advance longitudinally through the rotating shell 13. Adjacent the discharge end of the rotating shell fine water sprays 16 are provided above the bed of material to facilitate finally adjusting the moisture content and the condition of the agglomerated mineral feed material immediately before discharge from the rotating shell. When operating under the foregoing conditions agglomerated mineral feed material having a temperature of about 175° F. is discharged from the rotating shell at a rate of about one ton every 10 minutes. The rate may vary from about one ton every 6 minutes to one ton every 12 minutes, depending on whether the ambient temperature is above normal or below normal. The water and steam additions are continuously regulated under preferred operating conditions so that the agglomerated material discharged from the rotating shell has a particle size below about 2 mesh and above 20 mesh.

The agglomerated material discharged from the rotating agglomeration shell is charged directly into a rotating inclined cylindrical dryer 17 about 40 ft. long and 7 ft. in diameter with a gas fired combustion chamber 18 disposed at the inlet end thereof. The combustion chamber 18 heats air to be drawn through the dryer 17 at a temperature of about 300° F. The lower end of the cylindrical dryer 17 is provided with an exit stack 19 through which drying gases pass upwardly to a cyclone-type dust collector 20 having a blower 21 associated therewith for drawing the drying gases through the cylindrical dryer and dust collector. The combustion chamber which heats the hot air for drying the agglomerates is controlled by the temperature of the exit stack 19 and preferably is maintained between about 140° F. and 200° F., with the optimum stack temperature being between 185° F. and 200° F. The rotating cylindrical dryer 17 having a diameter of 7 ft. preferably has about 20,000 cubic feet per minute of hot air drawn therethrough while the dryer 17 is rotated at a rate of about 8 r.p.m. During the passage of the agglomerates through the dryer 17 the moisture content is reduced to between about 2.4% and 5.1% by weight and preferably to about 3.5% and 4% by weight. The gas leaving the rotating dryer containing entrained fine dust passes through the cyclone dust collector 20 wherein the dust particles are removed, and the fines are deposited on the charging conveyor belt 12 and recharged to the rotating agglomeration shell 13.

The product size of the granular feed material is preferably controlled by passing the discharge from the cylindrical dryer 17 to a double deck electrically vibrated screen 25. The mineral feed granules having a size greater than 8 mesh are ground in a grinding mill 26 and returned by elevator 27 for rescreening on the double deck screen 25, while the granules having a size less than 16 mesh are recycled and charged to the rotating agglomeration shell 13.

The granular mineral feed product as above produced has a particle size distribution between about 8 and 16 mesh and has an approximate analysis of between about 16 and 19% calcium, about 4% phosphorous, between about 8 and 10% sodium chloride, and about .008% iodine, all on a dry weight basis.

The granular mineral feed product has a density of about 50 to 60 pounds per cubic foot, requires an average compression strength of 0.31 pound to crush granules thereof having a mean diameter of 2.19 mm., and exhibits substantial resistance to crushing or dusting during normal handling. The mineral feed granules produced were capable of being shipped in conventional bags and admixed with conventional feed materials without disintegrating appreciably or forming an objectionable amount of dust so that substantial havings are possible for the feed mill operator and the livestock owners because of the substantially dustless properties of the granular mineral feed product of the present invention.

The feed granules prepared in the foregoing manner are used by mixing with the normal rations for hogs, beef cattle, dairy cattle, calves, sheep, broiler, starter, growing or turkey mashes in a ratio of 2.5 pounds mineral feed granules to each 100 pounds of normal ration or one 50-pound bag of feed granules per ton of ration. In laying mash, it is preferred to use 5 pounds of mineral feed granules to each 100 pounds of ration or two 50-pound bags per ton of ration.

While "soft phosphate" has been used in the foregoing example, other sources of feed grade phosphate or phosphorous compounds characterized by their ability to provide an available source of phosphate and exhibit a low fluorine content can be used in accordance with approved nutritional practice. Among the materials which can be used in finely divided form are bone meal, bone black, dicalcium phosphate, defluorinated phosphate, defluorinated super phosphate, raw rock phosphate, phosphate, Curacao, and phosphatic limestone, as shown in the following examples.

In the formulation of Example 1 other sources of calcium instead of limestone can also be used, including oyster shell flour, calcite, gypsum, and wood ashes, all in a very finely divided form. It should also be understood that the feed granule composition of Example 1 and others illustrated herein can be modified to include other ingredients, such as vitamins or antibiotics, as desired.

Example 2

|  | Pounds |
|---|---|
| Soft phosphate | 925 |
| Limestone | 852.5 |
| Sodium chloride | 180 |
| Animal glue liquor (40% solids) | 20 |
| Trace mineral premix | 12.5 |
| Steamed bone meal | 5 |
| Dicalcium phosphate | 5 |
| Iron oxide | 20 |

The foregoing mineral feed supplement ingredients except the animal glue liquor are weighed, mixed and introduced into the rotating inclined cylindrical agglomerate shell 13, as in Example 1. The solid feed ingredients which have the same particle size distribution as in Example 1 are moistened by spraying the animal glue liquor thereon at the inlet end of the shell 13 (no additional water required) and heated to a temperature between about 175° and 200° F. by adding steam through the sparger pipe 15 in an amount between about 60 and 180 lbs. per ton of the feed ingredients. The agglomerated mineral feed material is thereafter dried in a rotating cylindrical dryer 17 and screened, as in Example 1. The granular mineral feed supplement has an average compression strength of 0.5 lb. as compared with a compression strength of 0.31 lb. for the granules of Example 1, and is non-dusting during normal packaging and handling. On immersion in water the granules begin to disintegrate immediately, although at a slower rate than the granules of Example 1, and are adapted to be readily assimilated on ingestion.

Example 3

|  | Pounds |
|---|---|
| Soft phosphate | 925 |
| Limestone | 852.5 |
| Monosodium phosphate | 180 |
| Trace mineral premix | 12.5 |
| Steamed bone meal | 5 |
| Dicalcium phosphate | 5 |
| Iron oxide | 20 |

The foregoing mineral feed supplement ingredients are weighed, mixed and introduced into the rotating inclined cylindrical agglomerator shell 13, as in Example 1. The feed ingredients are moistened by spraying water through sparger pipe 14 in an amount between about 50 and 150 lbs. per ton of feed ingredients and heated to a temperature between about 175° and 200° F. by adding steam through the sparger pipe 15 in an amount between about 60 and 180 lbs. per ton of feed ingredients. The agglomerated mineral feed material is thereafter dried in a rotating cylindrical dryer 17 and screened, as in Example 1. The granular mineral feed supplement has an average compression strength of 0.6 lb. as compared with a compression strength of 0.31 lb. for the granules of Example 1, and is non-dusting during normal packaging and handling. On immersion in water the granules begin to disintegrate immediately, although at a slightly slower rate than the granules of Example 1, and are adapted to be readily assimilated on ingestion.

Example 4

|  | Pounds |
|---|---|
| Soft phosphate | 925 |
| Limestone | 852.5 |
| Urea | 180 |
| Trace mineral premix | 12.5 |
| Steamed bone meal | 5 |
| Dicalcium phosphate | 5 |
| Iron oxide | 20 |

The foregoing mineral feed supplement ingredients having the same size distribution as in Examples 1, 2 and 3 are weighed, mixed and introduced into the rotating inclined cylindrical agglomerator shell 13, as in Example 1. The feed ingredients are moistened by spraying water through sparger pipe 14 in an amount between about 40 and 120 lbs. per ton of feed ingredients and heated to a temperature between about 175° and 200° F. by adding steam through the sparger pipe 15 in an amount between about 60 and 180 lbs. per ton of feed ingredient. The agglomerated mineral feed material is dried in a rotating cylindrical dryer 17 and screened, as in Example 1. The granular mineral feed supplement has an average compression strength of 0.6 lb. and is non-dusting during normal packaging and handling. On immersion in water the granules begin to disintegrate immediately, although at a slower rate than the granules of Example 1, and are readily assimilated.

Example 5

|  | Pounds |
|---|---|
| Defluorinated phosphate | 387.5 |
| Curacao phosphate | 200 |
| Salt (sodium chloride) | 600 |
| Trace mineral premix | 12.5 |
| Limestone | 800 |
|  | 2000 |

The foregoing mineral feed supplement ingredients are weighed in hopper 30 (see FIG. 2), mixed and introduced from a surge hopper 31 into the rotating inclined pelletizing disc apparatus 33 which has a disc diameter of 10 ft. and is provided with water spray pipes 36. Heating means are provided for heating the contents of the pelletiz-disc. The feed agglomerates discharged from disc 33 are thereafter dried in a rotating cylindrical dryer 37 similar to dryer 17 and are heated by air drawn through a gas-fired combustion chamber 38. The dryer 37 has an exit stack 39 through which the drying gases pass upwardly to a cyclone-type dust collector 40 having a blower 41 associated therewith for drawing the drying gases through the cylindrical dryer and dust collector. The granular mineral feed material is discharged from the cylindrical dryer 37 into a rotating cylindrical cooler 42 wherein the temperature of the granules is reduced to about ambient room temperature or to within about 20° F. of ambient room temperature before the granules are classified on the double-deck screens 45. The oversize material from the screens 45 is ground in a grinder 46 and recycled by means of elevator 47. The cooling air leaving the cooler 42 containing entrained fines is conveyed to the dust collector 40 which removes the fines, and the fines are recharged to the pelletizing disc 33 by conveyor means 32.

The granular feed supplement product is non-dusting and resistant to crushing so that it can be handled and packaged in the normal manner without creating objectionable fines. The granules disintegrate readily on contacting with an aqueous liquid so that the granules are adapted to be readily assimilated on ingestion.

Example 6

| | Pounds |
|---|---|
| Meat scraps | 1280 |
| Peanut meal | 240 |
| Salt (sodium chloride) | 240 |
| Molasses | 150 |
| 80% blood meal | 40 |
| | 2000 |

The foregoing solid protein feed supplement ingredients having a particle size distribution of about 9.3% by weight above 20 mesh, about 46.6% between 20 and 60 mesh, about 44.1% and below 60 mesh are weighed, mixed and introduced into the rotating inclined cylindrical agglomeration shell 13, as in Example 1. The molasses is sprayed onto the solid feed ingredients at the inlet end of shell 13. Water and steam are added through sparger pipes 14 and 15, respectively, to provide between 50 and 150 lbs. water and 50 to 150 lbs. steam to moisten and heat the protein feed supplement ingredients to a temperature between about 150 and 200° F. The protein feed agglomerates are thereafter dried in a rotating cylindrical dryer 17. The granular protein feed supplement is discharged from the dryer 17 into the double-deck screens 25, as in Example 1.

The granular protein feed supplement material has a compression strength of about 1.1 lbs. as compared with 0.31 lb. for the granules of Example 1, and the granules produced are non-dusting so that the material can be handled, shipped and mixed in the usual manner without creating fines. On immersion in water the protein feed granules begin to disintegrate so that the granules are adapted to be readily assimilated on ingestion.

Example 7

| | Pounds |
|---|---|
| Meat scraps | 1280 |
| Peanut meal | 240 |
| Salt (sodium chloride) | 240 |
| 80% blood meal | 40 |
| Trace mineral premix | 50 |

The foregoing protein feed supplement ingredients having a particle size distribution of about 9.3% by weight above 20 mesh, about 46.6% between 20 and 60 mesh, about 44.1% below 60 mesh are weighed, mixed and introduced into the rotating inclined cylindrical agglomeration shell 13, as in Example 1. Water and steam are added through sparger pipes 14 and 15, respectively, to provide between 60 and 180 lbs. water and 60 to 180 lbs. steam to moisten and heat the protein feed supplement ingredients to a temperature between about 150 and 200° F. The protein feed agglomerates are thereafter dried in a rotating cylindrical dryer 17. The granular protein feed supplement is discharged from the dryer 17 into the double-deck screens 25, as in Example 1.

The granular protein feed supplement material has a compression strength of 1.0 lb. as compared with 0.31 lb. for the granules of Example 1, and the granules produced are non-dusting so that the material can be handled, shipped and mixed in the usual manner without creating excessive fines. On immersion in water the protein feed granules begin to disintegrate so that the granules are adapted to be readily assimilated on ingestion.

Example 8

| | Pounds |
|---|---|
| Meat scraps | 1280 |
| Peanut meal | 240 |
| Salt (sodium chloride) | 480 |
| 80% blood meal | 40 |
| Trace mineral premix | 50 |
| | 2090 |

The foregoing protein feed supplement ingredients having a particle size distribution of about 9.3% by weight above 20 mesh, about 46.6% between 20 and 60 mesh, about 44.1% below 60 mesh are weighed, mixed and introduced into the rotating inclined cylindrical agglomeration shell 13, as in Example 1. Water and steam are added through sparger pipes 14 and 15, respectively, to provide between 75 and 200 lbs. water and 80 to 240 lbs. steam to moisten and heat the protein feed supplement ingredients to a temperature between about 150 and 200° F. The protein feed agglomerates are thereafter dried in a rotating cylindrical dryer 17. The granular protein feed supplement is discharged from the dryer 17 into the double-deck screens 25, as in Example 1.

The granular protein feed supplement material has a compression strength of 1.0 lb. as compared with 0.31 lb. for the granules of Example 1, and the granules produced are non-dusting so that the material can be handled, shipped and mixed in the usual manner without creating excessive fines. On immersion in water the protein feed granules begin to disintegrate so that the granules are adapted to be readily assimilated on ingestion.

Example 9

A 2000 pound quantity of dry ground meat scraps having a particle size distribution of about 8.2% by weight above 20 mesh, about 40.6% between 20 and 60 mesh, and about 51.2% below 60 mesh is weighed, and introduced into the rotating inclined cylindrical agglomeration shell 13, as in Example 1. Water and steam are added through sparger pipes 14 and 15, respectively, to provide between 75 and 200 lbs. water and 60 to 180 lbs. steam to moisten and heat the protein feed supplement to a temperature between about 150 and 200° F. The agglomerated material is thereafter dried in a rotating cylindrical dryer 17. The granular protein feed supplement is discharged from the dryer 17 into the double-deck screens 25, as in Example 1.

The granular protein feed supplement material has a compression strength of 0.9 lb. as compared with 0.31 lb. for the granules of Example 1, and the granules produced are non-dusting so that the material can be handled, shipped and mixed in the usual manner without creating excessive fines. On immersion in water the protein feed granules begin to disintegrate so that the granules are adapted to be readily assimilated on ingestion.

Example 10

A protein feed supplement comprising 2000 pounds of dry ground meat scraps having a particle size distribution of about 8.2% by weight above 20 mesh, about 40.6% between 20 and 60 mesh, about 51.2% below 60 mesh is weighed and introduced into the rotating inclined cylindrical agglomeration shell 13, as in Example 1. A quantity of animal glue liquor (40% solids) is sprayed onto the meat scraps at the inlet end of shell 13. Steam is added through sparger pipe 15 at a rate of about 60 to 180 lbs. steam per ton of meat scraps to further moisten and heat the protein feed supplement ingredient to a temperature between about 200 and 225° F.

The dry ground meat scrap material used in the preceding examples is the conventional dried naphtha extracted residue from rendering meat waste which is ground so that all of the particles pass a 14 mesh standard screen. The meat scrap contains about 55% total protein of which about 26% is water soluble, and about 6.6% fat.

The dried agglomerates of feed material in the preceding examples have a compression strength ranging between about 0.3 and 1.2 pounds. The granules having a compression strength of about 0.3 pound have about the minimum required resistance to crushing to permit normal handling without creating excessive fines and completely disintegrate very rapidly in seconds for improved assimilation. The granules having a compression strength of about 1.2 pounds are very resistant to crushing while at the same time readily disintegrating for improved assimilation. In contrast with the feed granules produced in accordance with the present invention, an extruded feed pellet exhibits a compression strength of about 6.5 pounds and shows no evidence of disintegration after immersion in water for 15 minutes.

It will be understood by those skilled in the art that the trace minerals which are generally recommended for nutritional use in animal feed supplements including manganese sulfate, iron carbonate, copper oxide, cobalt sulfate, zinc oxide, and calcium iodate can be added to the agglomeration apparatus individually as well as a standard premix. The individual mineral compounds should be very finely ground so that substantially all will pass through a standard 60 mesh screen.

From the foregoing description it will be evident that the present invention provides a granular feed material which has excellent handling properties and which is both palatable and readily assimilated after ingestion by animals. The process of producing the feed granules has the advantage of being very simple and inexpensive, requiring the addition of only water and/or steam to a feed mixture, all of the ingredients of which are nutritionally useful and commonly used as a feed material.

We claim:

1. A method of preparing an animal mineral feed composition in granular form which comprises: mixing a major proportion of finely divided particles of nutritionally useful water insoluble animal feed supplement materials capable of being assimilated by a living animal selected from a group consisting of soft phosphate, dicalcium phosphate, calcium carbonate, bone meal and essential trace minerals with a minor proportion of at least 2% by weight sodium chloride, and while mixing adding steam and water to said water insoluble materials to moisten and raise the temperature of said material to about 225° F. and continuing said mixing to form agglomerates directly from said heated materials, said steam and water each being added to said materials in an amount between about 5% and 15% by weight, and drying said agglomerates to effect removal of water in excess of about 2.5% to 5.0% by weight and to crystallize said sodium chloride in said agglomerates; whereby mineral feed granules are formed having the individual particles thereof held together primarily by crystallized sodium chloride.

2. A method as in claim 1, wherein said sodium chloride is used in an amount between about 8% and about 25% by weight.

3. A method as in claim 1, wherein at least a portion of said sodium chloride is added during said mixing as an aqueous solution.

4. A method of preparing an animal mineral feed composition in granular form which comprises: mixing a major proportion of finely divided particles of nutritionally useful water insoluble animal feed supplement materials capable of being assimilated by a living animal selected from a group consisting of soft phosphate, dicalcium phosphate, calcium carbonate, bone meal and essential trace minerals with a minor proportion of a water soluble material nutritionally useful to animals selected from the group consisting of sodium chloride, sodium phosphate and urea with said water soluble material being used in an amount between about 2% and 25% by weight of said composition, and while mixing adding steam and water to said materials to moisten and raise the temperature of said material to about 225° F. and continuing said mixing to form agglomerates directly from said heated materials, said steam and water each being added to said materials in an amount between about 5% and 15% by weight, and drying said agglomerates at a temperature of about 225° F. to effect removal of water in excess of about 2.5% to 5.0% by weight and to crystallize said water soluble material in said agglomerates.

References Cited

UNITED STATES PATENTS 3,189,433   6/1965   Hollingsworth et al. __ 99—2 XR

FOREIGN PATENTS

| 539,298 | 9/1941 | Great Britain. |
| 655,114 | 7/1951 | Great Britain. |
| 785,016 | 10/1957 | Great Britain. |
| 624,812 | 8/1961 | Canada. |

RAYMOND N. JONES, Primary Examiner

J. M. HUNTER, Assistant Examiner

U.S. Cl. X.R.

99—4

UNITED STATES PATENT OFFICE
CERTIFICATE OF CORRECTION

Patent No. 3,464,824　　　　　　　　　　　　　　September 2, 1969

Charles C. Jensen et al.

It is certified that error appears in the above identified patent and that said Letters Patent are hereby corrected as shown below:

Column 1, line 45, "subjected" should read -- subject --. Column 4, line 42, "its bed" should read -- the bed --; line 64, "agglomerate shell" should read -- agglomeration shell --. Column 7, line 16, "havings" should read -- savings --; line 61, "agglomerate" should read -- agglomerator --. Column 9, line 4, "pelletiz" should read -- pelletizing --; line 38, insert as last line of formulation -- Trace Mineral Premix-----50 --; line 47, "sprager" should read -- sparger --. Column 10, line 3, "sprager" should read -- sparger --.

Signed and sealed this 9th day of June 1970.

(SEAL)

Attest:

Edward M. Fletcher, Jr.　　　　　　　　　　　　WILLIAM E. SCHUYLER, JR.
Attesting Officer　　　　　　　　　　　　　　　　Commissioner of Patents